MILLIMETER MICROWAVE GENERATOR
Filed June 16, 1967
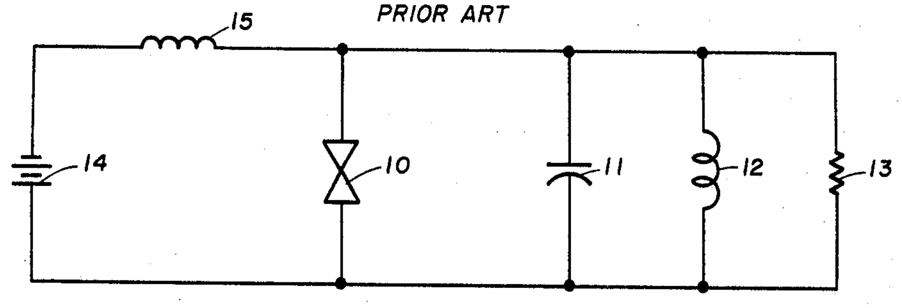
FIG. 1
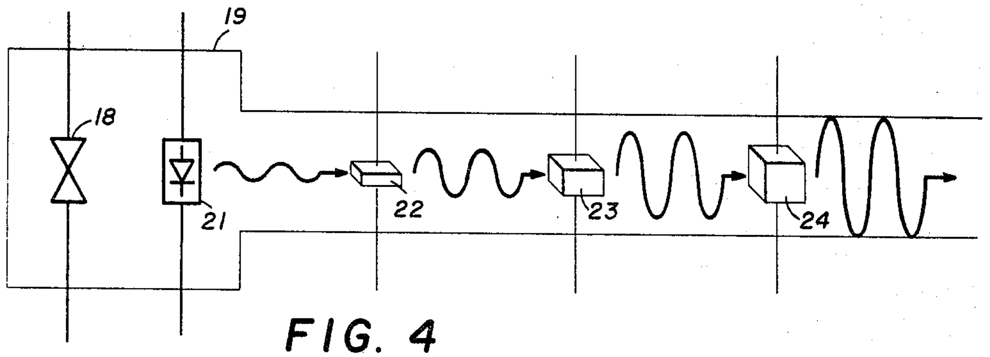
FIG. 4
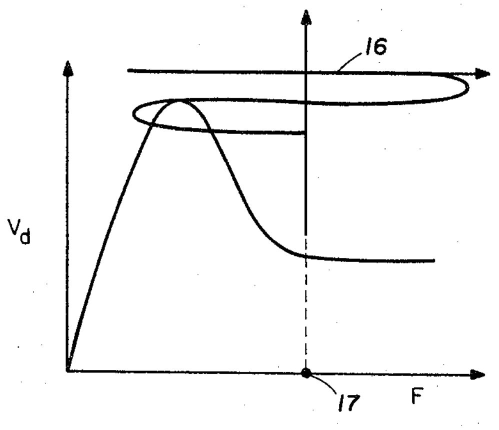
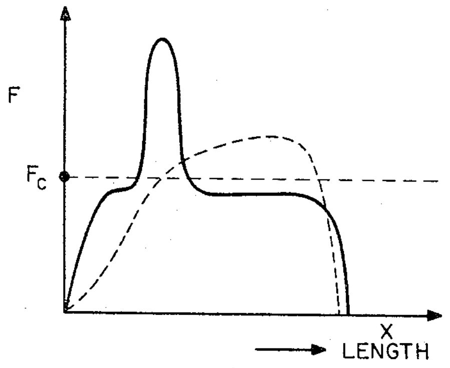
FIG. 2
FIG. 3
INVENTOR
TURNER E. HASTY
Harold C. Meier
ATTORNEY United States Patent Office 3,436,680
Patented Apr. 1, 1969

3,436,680
MILLIMETER MICROWAVE GENERATOR

Turner E. Hasty, Dallas, Tex., assignor to Texas Instruments Incorporated, Dallas, Tex., a corporation of Delaware Filed June 16, 1967, Ser. No. 646,716
Int. Cl. H03b 5/12, 5/32
U.S. Cl. 331—107 6 Claims

ABSTRACT OF THE DISCLOSURE

Apparatus for generating a millimeter microwave signal including a bulk negative resistance device operated in a transit time frequency mode and generating a signal having a fundamental frequency. A filter suppresses the fundamental and all harmonics below a given level from a signal generated by a harmonic generator responsive to the fundamental frequency produced by the transit time operated negative resistance device. A plurality of serial arranged bulk negative resistance devices operated in a limited space charge accumulation mode are responsive to and amplify the most significant harmonic passed by said filter.

The classic mode of operation of a bulk negative resistance device is the transit time frequency mode described by J. B. Gunn in the early 1960's The Gunn mode of operation is achieved by placing a bulk negative device in an electrical circuit which presents a low impedance load to the device and biases it above the critical voltage. The frequency of oscillations of a bulk device operated in the Gunn mode wtih a low impedance load circuit is approximately equal to the recirocal of the electron transit time through the sample. If the low impedance load is replaced by a resonant circuit, the frequency of oscillations in the bulk device can be varied by simply changing the resonant frequency of the load.

Recent investigations have established that a new mode of operation known as the limited space charge accumulation (LSA) can be effected by the use of a proper load and bias for the device. Devices operating in the LSA mode have true negative resistance characteristics and are useful as millimeter energy sources having at least tens of milliwatts available continuous power and possibly kilowatts of pulse power, and operating at efficiencies in the 10% to 20% range. The LSA mode of operation has been achieved in samples of n-type GaAs.

A bulk negative resistance device will operate in the LSA mode if the resonant frequency of its associated circuitry is in the correct range for the doping level. This frequency is considerably higher than (typically four times) the natural transit time frequency of the bulk device. Because a negative resistance device is not self-starting in the LSA mode, a high Q resonant circuit having a very large resistance (typically one hundred times) as compared with the low field resistance of the bulk negative device has been used during the initial oscillation period. The biasing voltage connected to the bulk device is three or four times the threshold voltage when operating in the LSA mode, and the radio frequency appearing across the device has a voltage swing great enough to drive the device below the threshold value during part of each cycle. When operating in the LSA mode, the radio frequency electric field changes from below the threshold value to a value more than twice the threshold field so quickly that the space charge distribution associated with a high field domain does not have time to form.

In accordance with the present invention, the frequency of oscillations in a bulk negative resistance device is initiated by an energy wave inicdent thereon. To produce a wave capable of transmitting tens of milliwatts continuous power, a plurality of bulk devices are arranged in series each receiving an energy wave of low power from the preceding device and transmitting an energy wave of high power to a subsequent device. The initial wave is generated by a bulk negative resistance device operating in the Gunn mode followed by a harmonic generator and a filter for suppressing the fundamental and all harmonics up to a preset level. The Gunn mode oscillator, the filter, and the plurality of bulk devices are mounted in a microwave circuit which can be in the form of a stripline integrated circuit. Thus, there is provided a millimeter microwave generator producing a relatively high power output without the use of high Q circuits.

Another object of the invention is to provide a millimeter microwave source that is self-starting when fully loaded.

Still another object of the invention is to provide a millimeter microwave source completely formed on a stripline integrated circuit.

Yet another object of the invention is to provide a millimeter microwave source having bulk negative resistance devices operated in the LSA mode.

A more complete understanding of the invention and its advantages will be apparent from the specification and claims, and from the accompanying drawings illustrative of the invention.

Referring to the drawings:

FIGURE 1 is a schematic of an equivalent electrical circuit showing a millimeter microwave generator of the prior art;

FIGURE 2 is a plot of an electric field across a bulk negative resistance device in the transit time mode and the LSA mode;

FIGURE 3 is a plot of drift velocity vs. electric field in a negative resistance device and the radio frequency driving voltage when operated in the limited space charge accumulation mode; and FIGURE 4 is a schematic of a microwave millimeter source in accordance with this invention.

Although not necessarily limited thereto, this description will proceed to describe a millimeter microwave source using gallium arsenide (GaAs) as bulk negative resistance devices. Other materials, such as many of the III–V semiconductor materials, that exhibit negative resistance characteristics can be used.

The element of primary importance in the operation of the present millimeter microwave generator is the bulk negative resistance device. The transit time frequency mode of such a device was described by Gunn in his work with gallium arsenide (GaAs) bulk negative resistance devices. Prior to Gunn's work, it had been determined that GaAs exhibited negative resistance characteristics when an electric field of greater than 3,000 volts per centimeter was applied. It was also established prior to Gunn's experiments, that the electric field across a crystal of GaAs in the negative resistance region is not uniform but has a domain structure. As a result of this domain structure in the electric field distribution, it was felt that GaAs negative resistance devices were limited in usefulness. Gunn discovered that the high field domain was not stationary at one point in the crystal, but actually traveled across the crystal at approximately the drift velocity of an electron. Although the Gunn phenomena may result in the production of a useful source of microwave energy at frequencies between 6 gHz. and 30 gHz., it does not appear that significant power can be obtained from waves at higher freqencies.

In prior art millimeter microwave generators, the bulk negative resistance device is connected in series with a high Q parallel tuned circuit and a load resistor to suppress the field domain. Referring to FIGURE 1, there is shown schematically a circuit representing an equivalent wave guide wherein a bulk negative resistance device 10 is operated in series with a tuned circuit having a high Q and including a capacitor 11 and an inductor 12. A load resistor 13 is connected across the tuned circuit and a choke coil 15 in series with a D.C. voltage source 14, shown schematically as a battery, provides the necessary bias. The circuit shown is known as a LSA oscillator, that is, an oscillator having a bulk negative resistance device operating in a limited space charge accumulation mode. If the radio frequency voltage across the diode 10 can be made sufficiently high, there results a modified form of Gunn operation in which field domain does not form and the frequency of oscillations can be determined by the resonant frequency of the tuned circuit. The characteristics of the LSA mode are: (1) the frequency of operation is higher than the reciprocal of the carrier transit time (2) the frequency of oscillation is determined by the resonant frequency of the tuned circuit, and (3) the power output and efficiency are at least equal to but usually greater than the power output and efficiency of a Gunn oscillator.

In operation, although the LSA mode is inherently efficient because the entire device is operated in a negative state over most of the electric field cycle, there are limitations to its usefulness when operated in a system of the type shown in FIGURE 1. This is primarily because of the difficulties in causing a bulk negative resistance device to operate in the limited space charge accumulation mode. Since the LSA mode of oscillation is not self-starting, it is necessary for a large radio frequency electric field to build up across the crystal before it breaks into oscillations. To start the LSA oscillator of FIGURE 1, the device 10 is connected to the D.C. bias 14 and made to generate an energy wave at its natural transit time frequency. This wave includes a fundamental frequency and its harmonics and is directed through a wave guide to the tuned circuit of capacitor 11 and inductor 12. The tuned circuit is adjusted to resonant at a particular harmonic of the fundamental frequency of the energy wave and all harmonics up to a preferred level. The preferred harmonic is fed back to the device 10 thereby causing it to operate at the resonant frequency of the tuned circuit instead of its natural frequency. Thus, the starting energy is generated by operating the crystal in a limited space charge mode in a lightly loaded condition and mounted in a reasonably high Q cavity. Since the optimum load for a system such as shown in FIGURE 1 is different in the starting mode than in the operating mode, it is necessary to adjust the load 13 to achieve maximum power after oscillations have commenced by means of a tuning slug. Care must be exercised when adjusting the tuning slug to prevent overloading the diode 10 thereby causing oscillations to cease.

In the LSA mode, the negative resistance device 10 operated with a large (8,000 v./cm.), high frequency electric field across its terminals. The amplitude of the electric field is such that the terminal voltage across the device is driven below threshold during the negative half cycle of the field, and the frequency of the field is high enough so that its period is short compared to the dielectric relaxation time of the device when biased in the negative resistance region. The electric field distribution vs. distance for the transit time frequency mode of operation described by Gunn and the limited space charge accumulation mode are plotted in FIGURE 2. The electric field distribution is plotted on the vertical axis versus the distance across the crystal on the horizontal axis. The critical field strength above which negative resistance characteristics are exhibited is identified on the vertical axis by Fc and shown as a dotted line. The domain structure (shown solid), represents the operation of a negative resistance device in the transit time frequency mode and may be several times larger than actually shown. The dotted line curve represents a true negative resistance device such as the device 10 operating in the LSA mode. Because the period of the radio frequency field generated by the tuned circuit is short, the domain does not have time to form and true negative resistance characteristics result.

Referring to FIGURE 2, there is shown the drift velocity of the electrons in a negative resistance device versus the electric field strength across its terminals. The radio frequency voltage generated across the device is illustrated by the curve 16. With reference to the system of FIGURE 1, the D.C. bias source 14 biases the device 10 at the point 17 on the horizontal axis. Before generation of the radio frequency curve 16, the device 10 operates in the Gunn mode as described previously, and its field strength curve would be similar to that shown in FIGURE 2. After the radio frequency curve 16 has been generated, the device 10 is driven below the threshold level during part of each cycle. This high frequency electric field rises from below the threshold voltage to a value more than three times the threshold value and drops again so quickly that the space charge distribution associated with the high field domain does not have time to form. Instead, there is only an accumulation layer formed at the cathode contact and the rest of the device is in a negative resistance region. When the electric field drops below the threshold value, the space charge which has accumulated during the positive half cycle of the radio frequency field must decay. This decay can only be achieved if the dielectric relaxation of the material, at an electric field below threshold, is large compared with the period of oscillation of the electric field. The dielectric relaxation time of a material is defined by the relation $$T=\frac{\epsilon}{ne|\mu|}$$

where $\epsilon$ is the dielectric constant, $n$ is the carrier concentration, $e$ is the electronic charge and $\mu$ is the electron mobility.

In accordance with this invention, a Gunn oscillator operating at its natural frequency triggers oscillations in the first crystal of a chain all operating in a limited space charge accumulation mode. Referring to FIGURE 4, there is shown a millimeter microwave generator including a bulk negative resistance device 18 mounted in a wave guide 19 and connected to an appropriate D.C. bias source, not shown, for operation in the transit time frequency mode. The wave generated by the device 18 is transmitted through the wave guide 19 to a harmonic generator 21 of a diode configuration. The output of the harmonic generator 21 is filtered by appropriate wave guide filtering techniques to eliminate the fundamental frequency generated by the device 18 and all harmonics up to a preferred value. Downstream of the wave guide filtering system there is mounted a plurality of negative resistance devices 22, 23, and 24 biased above their threshold levels by D.C. sources, not shown, for operation in the LSA mode and mounted in the wave guide 19. Any number of negative resistance devices could be so mounted. The negative resistance devices 22, 23, and 24 are spaced in the wave guide 19 an integral number of half wavelengths apart. The number of integral half wavelengths between adjoining resistance devices is determined by mechanical considerations and not to achieve any particular operating characteristics.

In operation, the negative resistance device 18 is biased to operate in the transit time frequency mode and generate low power oscillations at its natural frequency. The electric field across the device 18 has a domain structure as was described with reference to FIGURE 2. As such, it is not operating as a true negative resistance device. The low power output of device 18 is transmitted to the diode 21 which generates a nonlinear function having the fundamental and harmonics of the signal incident thereon. In accordance with standard wave guide filtering techniques, the nonlinear function generated by the diode 21 is filtered to suppress the fundamental and all harmonics up to a preferred level. The preferred harmonic is transmitted through the wave guide 19 and incident upon the negative resistance device 22. As mentioned previously, a negative resistance device operates at about 8,000 volts per centimeter in the LSA mode. Since the output of the device 18 is a relatively weak signal, the first negative resistance device 22 must be thin enough to insure operation in an 8,000 volt per centimeter electric field. The negative resistance device 22 amplifies the preferred harmonic which is transmitted to and supplies the radio frequency field to the second negative resistance device 23. The energy wave incident upon the device 23 corresponds to the wave 16 shown in FIGURE 3. As such, it drives the device 23 below threshold once during each cycle and true negative resistance characteristics are achieved such as shown by the dotted curve of FIGURE 2. Since the energy wave incident upon the device 23 is amplified by the device 22, the active length of the second negative resistance device may be two times that of the first device and still operate with a radio frequency field in excess of 8,000 volts/cm. The output of the negative resistance device 23 is an amplified energy wave of the preferred harmonic which is incident upon and functions as the radio frequency field to the third negative resistance device 24. The negative resistance device 24 again amplifies the preferred harmonic which is transmitted through the wave guide 19 to another negative resistance device or to a load circuit. Any number of negative resistance devices may be arranged serially to generate a signal of the desired power level.

A millimeter microwave generator of the type shown in FIGURE 4 is self-starting and can be connected to the desired load during the start-up operation. In addition, the system of FIGURE 4 does not require a high Q circuit during start up.

In a typical embodiment of the system shown in FIGURE 4, the Gunn oscillator consisted of the GaAs device five microns thick and generating a frequency of 20 gHz. The harmonic generator consists of a diode mounted in a wave guide filter to suppress the fundamental, the second, and the third harmonics of the wave generated by the harmonic generator and pass the fourth and all higher harmonics. The most significant frequency passed by the filter system is the fourth harmonic having a frequency of 80 gHz. which is the frequency of the output signal. The 80 gHz. signal from the filter is the radio frequency electric field to the first of three LSA operated devices. The first LSA operated device is a two to five micron thick crystal of GaAs. The second LSA operated device and the third LSA operated device are also GaAs crystals having a thickness of ten microns and twenty microns, respectively.

Although the above description exemplified a millimeter microwave generator employing wave guide construction, such a system will be particularly useful in integrated microwave stripline circuits. One of the advantages of this invention is that LSA operation is possible in relatively low Q circuits whereas in the conventional LSA oscillator, as shown in FIGURE 1, a high Q circuit is required for starting. For an integrated microwave stripline the entire circuit is fabricated on a monolithic slice of semi-insulating GaAs about 0.004 inch thick. A ground plane is formed over the bottom surface of the substrate by a metallized film, which may be D.C. isolated from the GaAs substrate by an insulating layer of silicon dioxide. The substrate provides the dielectric for a microstrip transmission line.

The Gunn oscillator is comprised of a heavily doped n-type region formed in the upper surface of the substrate and a more lightly doped n-type region formed within the heavily doped region. In general, the high resistivity GaAs in the lightly doped region exhibits a frequency-sensitive negative-resistance effect under the influence of a high electric field established between the low resistivity heavily doped region and a metallized contact deposited on the higher resistivity region. In practice, the low resistivity region and the higher resistivity region are formed by successive epitaxial depositions in a pit etched in the surface of the semi-insulating GaAs substrate.

A semi-insulating GaAs substrate has been defined as being a form of gallium arsenide which has a resistivity greater than $10^4$ ohm-centimeters. This material can be prepared by adding various doping elements, which produce deep levels, to the gallium arsenide during crystal preparation. High resistivity GaAs can also be obtained without compensation with the doping elements which produce the deep levels by achieving high purity.

A load impedance connected to the Gunn oscillator is designed to maintain oscillation and provide adequate power output. Provisions are made for D.C. biasing the higher resistivity region and connecting one terminal to ground. A one-half wavelength open ended microstrip stub is adequate to provide an RF ground.

The harmonic generator is typically a Schottky barrier diode of GaAs in which a rectifying junction is formed between a metallic film and a relatively lightly doped n-type GaAs layer. For example, a heavily doped, low resistivity GaAs region is formed with four relatively high resistivity n-type GaAs expitaxial regions formed therein.

The output of the harmonic generator is coupled to the input of a standard stripline design. A complete description of a stripline filter, harmonic generator, and Gunn oscillator is given in the copending U.S. application of Tom M. Hyltin, Ser. No. 606,097, filed Dec. 30, 1966 and assigned to the same assignee.

The LSA operated negative resistance devices are fabricated in essentially the same manner as the Gunn oscillator. Again, each is comprised of a heavily doped n-type region formed in the upper surface of the semi-insulating GaAs substrate and a more lightly doped n-type region formed within the heavily doped region. Typical thicknesses of the various LSA operated devices are five microns for the first device, ten microns for the second device, and twenty microns for the third device. Since the LSA mode of oscillation in GaAs requires a radio frequency field of approximately 8,000 volts per centimeter to start, the first LSA mode device is relatively thin to insure that the RF voltage from the Gunn oscillator is sufficient to start oscillations. And since each LSA mode operated device amplifies its input signal, thicker devices are located at integral number of half wavelengths away.

While several embodiments of the invention, together with modifications thereof, have been described in detail herein and shown in the accompanying drawings, it will be evident that various further modifications are possible in the arrangement and construction of its components without departing from the scope of the invention.

I claim:

1. A millimeter microwave generator comprising:

a GaAs crystal operated in the transit time frequency mode for generating a low power frequency wave, means for generating a harmonic of said frequency wave, and a plurality of GaAs crystals operated in the limited space charge accumulation mode generating oscillations at the harmonic frequency and positioned in a serial arrangement, the first of said plurality of GaAs crystals located in the field of said harmonic wave and each of the other of said crystals located in the wave generated by the preceding crystal displaced from said harmonic generating means.

2. A millimeter microwave generator as set forth in claim 1 wherein the active length of each of said plurality of GaAs crystals is two times the active length of the preceding crystal displaced from said harmonic generating means.

3. A millimeter microwave generator as set forth in claim 2 including a microwave guide in which said first GaAs crystal, said harmonic generating means, and said plurality of crystals are mounted.

4. A millimeter microwave generator comprising:

a GaAs crystal operated in the transit time frequency mode for generating a low power frequency wave, a harmonic generator responsive to said wave for generating the harmonics thereof, means for filtering the fundamental and all harmonics below a predetermined level, and a plurality of GaAs crystals operated in the limited space charge accumulation mode positioned in a serial arrangement, the first of said plurality of crystals responsive to the lowest harmonic wave passed by said filter and each subsequent crystal responsive to the wave generated by the previous crystal in said serial arrangement.

5. A millimeter microwave generator as set forth in claim 4 wherein said first GaAs crystal, said harmonic generator, said filter, and said plurality of GaAs crystals are part of a stripline microwave circuit.

6. A millimeter microwave generator as set forth in claim 5 wherein said plurality of GaAs crystals are located an integral number of half wavelengths from each other.

References Cited

UNITED STATES PATENTS

| | | | |
|---|---|---|---|
| 3,189,843 | 6/1965 | Bruck | 331—107 |
| 3,320,550 | 5/1967 | Gerlach | 331—107 |
| 3,339,153 | 8/1967 | Hakki | 331—56 |
| 3,354,408 | 11/1967 | Crowell | 331—56 |
| 3,378,789 | 4/1968 | Gerlach | 331—56 |

JOHN KOMINSKI, *Primary Examiner.*

U.S. Cl. X.R.

331—56